United States Patent [19]

Hånsson et al.

[11] 4,382,246
[45] May 3, 1983

[54] APPARATUS FOR MEASURING TEMPERATURE

[75] Inventors: Ingvar J. M. Hansson, Staffanstorp; Håkan B. Håkansson, Lund; Magnus G. K. Igefjord; Berth-Ove G. Wall, both of Bjärred, all of Sweden

[73] Assignee: Crafon Medical AB, Sweden

[21] Appl. No.: 196,079

[22] PCT Filed: Jan. 25, 1979

[86] PCT No.: PCT/SE79/00018
§ 371 Date: Sep. 25, 1980
§ 102(e) Date: Jun. 1, 1979

[87] PCT Pub. No.: WO80/01608
PCT Pub. Date: Aug. 7, 1980

[51] Int. Cl.³ .......... G01K 1/14; H01C 1/14; H01C 3/10
[52] U.S. Cl. .......... 338/26.13 HR; 29/612; 338/22 R; 339/176 MF; 374/185
[58] Field of Search .......... 73/362 AR, 362 SC; 338/22 R, 23, 25, 28; 339/176 MF, 17 F; 374/185

[56] References Cited

U.S. PATENT DOCUMENTS

| | | | |
|---|---|---|---|
| 2,703,833 | 3/1955 | Vanvor | 338/28 |
| 2,952,761 | 9/1960 | Smith-Johannsen | 338/314 X |
| 3,028,756 | 4/1962 | Takagishi | 73/372 AR |
| 3,077,511 | 2/1963 | Bohrer et al. | 339/17 F X |
| 3,109,227 | 11/1963 | Goodyear | 338/8 X |
| 3,189,863 | 6/1965 | Leach | 339/17 F |
| 3,393,392 | 7/1968 | Shelley | 339/176 MF X |
| 3,646,494 | 2/1972 | Waseleski et al. | 338/25 |
| 3,673,538 | 6/1972 | Faxon | 338/25 |
| 3,697,925 | 10/1972 | Henschen | 339/176 MF X |
| 3,750,471 | 8/1973 | Bremer | 73/362 AR X |
| 3,889,362 | 6/1975 | Tyler | 29/619 |
| 4,251,712 | 2/1981 | Parr | 338/314 X |
| 4,302,972 | 12/1981 | Oettle et al. | 73/362 AR |
| 4,317,367 | 3/1982 | Schonberger | 73/362 AR |

FOREIGN PATENT DOCUMENTS

| | | | |
|---|---|---|---|
| 2261531 | 6/1973 | Fed. Rep. of Germany | 336/28 |
| 2060610 | 5/1975 | Fed. Rep. of Germany | 73/25 |
| 2105486 | 4/1972 | France | 73/26 |
| 7863046 | 3/1978 | Sweden | 338/28 |
| 113427 | 12/1956 | U.S.S.R. | 73/25 |

*Primary Examiner*—Daniel M. Yasich
*Attorney, Agent, or Firm*—Lerner, David, Littenberg & Samuel

[57] ABSTRACT

The disclosure relates to an apparatus for measuring temperature, comprising a temperature-sensitive sensor (1, 1'), whose electric properties, for example, resistance, vary with the temperature, for example, one thermistor (2, 2', 3 or 3') which is connected to electric lines (5, 6) which, in turn, may be connected to a read-off unit for reading off the values of current, voltage or the like corresponding to the temperature. In the apparatus according to the invention, the electric lines are disposed between two insulating layers (7, 8) which present mutually offset holes (9, 10) each in register with their respective line (5, 6), whereby these may easily be connected to different sensing terminals in the above-mentioned read-off units. The apparatus according to the invention is primarily intended to be used for medicinal temperature measurement, but may, naturally, also be used in other contexts, for example, in pure industrial application where a simple and economical but nevertheless reliable reading-off of temperature is desired.

15 Claims, 6 Drawing Figures

APPARATUS FOR MEASURING TEMPERATURE

TECHNICAL FIELD

The present invention relates to an apparatus for measuring temperature, comprising a temperature-sensitive sensor, whose electric properties, for example, resistance, vary with the temperature, for example, a thermistor which is connected to electric lines which, in turn, may be connected to a read-off unit for reading off the values of current, voltage or the like corresponding to the temperature.

The apparatus according to the invention is primarily intended to be used for medicinal temperature measurement. Consequently, one aspect of the invention is to make the apparatus so simple and cheap that it may be disposed of after use, that is to say that it may not be reused.

At the same time however, it should be possible to manufacture the apparatus with such precision that the reader can rely with great certainty on the read-off values, this being, clearly, of the greatest importance precisely in medical use.

However, it is clear to a person skilled in the art that the apparatus according to the invention may be used in other contexts, for example, in pure industrial application in which a simple and inexpensive but nevertheless reliable reading-off of temperature is desired.

BACKGROUND ART

Swedish patent application No. 78.03046-7 (U.S. Ser. No. 779 152 filed Mar. 18, 1977, which is the parent of U.S. patent application Ser. No. 41,551, filed May 23, 1979, now U.S. Pat. No. 4,317,367) and the two copending PCT Applications PCT/SE78/00012 (U.S. patent application Ser. No. 131,079, filed July 3, 1978, now U.S. Pat. No. 4,269,633) and PCT/SE78/00013 (U.S. patent application Ser. No. 131,078, filed June 1, 1979, now U.S. Pat. No. 4,253,334) describe different embodiments of an apparatus similar to that according to the invention and how the apparatus according to the invention may be used. The concept forming the basis of the present invention is, in this instance, to realize such an apparatus, but of simpler type and adapted to a simpler manner of manufature.

In U.S. patent applications Ser. No. 787,422, filed Apr. 14, 1977, now U.S. Pat. No. 4,200,970 and Ser. No. 879,193, filed Feb. 21, 1978) there are described different trimming processes for apparatuses similar to that according to the invention. Such trimming processes could well be used for trimming the apparatus according to the invention. Preferably however, use is made instead of an assortment of the type described in co-filed application PCT/SE78/00012 (U.S. patent application Ser. No. 131,079, filed July 3, 1978, now U.S. Pat. No. 4,296,633).

DESCRIPTION OF THE INVENTION

The apparatus according to the invention is characterized in that the above-mentioned electric lines are disposed between two insulated layers which display mutually offset holes in register with each respective line, whereby these may easily be connected to different sensing terminals in the above-mentioned read-off unit.

The above-mentioned construction permits of a very simple manner of manufacture which will be described in greater detail below under the title "Preferred manner of manufacture".

Preferably, the two insulated layers consist of plastics-coated paper which may easily be thermally sealed to mutually contact each other and, respectively, to contact with other materials.

In order to increase the possibilities of rapid read-off, the two insulating layers present holes suitably located in register with each other and in register with the sensor. In order, in such an event, to prevent short-circuiting when the apparatus is used in wet or humid atmosphere, for example, in the mouth of a patient, the sensor and the hole in register therewith are covered by two insulating outer layers which do not, however, cover the mutually offset holes.

The sensor which is used may consist of two thermistors which are each connected by their first terminal to an intermediate line and are each connected by their second terminal to the above-mentioned electric line. As a result, the thermistors which are used need not be trimmed. Instead, it is possible, by selection, to choose two thermistors which, in the correct coupling, give the desired value of the electric property which is used for measuring the temperatures.

At the same time, handling of the thermistors (which normally are very small) is facilitated. The above-mentioned intermediate line may, for example, consist of a short strip of copper foil or other similar electrically-conductive material. Two such thermistors fixedly retained on one such copper foil are, in this case, easier to handle than separate thermistors.

The apparatus according to the invention is suitably designed in elongate form. The two electric lines may, in this case, be of substantially the same length as the two elongate insulating layers between which they are located. In such an event, the sensor is placed close to one end, whereas the mutually offset holes are placed proximal to the opposite end of the insulating layer. This arrangement makes it possible that the non-insulated lines may be grasped by the above-mentioned read-off unit, while the sensor is still located in the mouth of a patient.

As read-off unit, use may be made, for example, of one of those described in copending PCT application PCT/SE78/00013 (U.S. patent application Ser. No. 131,078, filed June 1, 1979, now U.S. Pat. No. 4,253,334), whose contents are herewith incorporated in the present application.

The insulating outer layers may also, suitably, be of plastics-coated paper or other liquid-tight flexible material. They can, in this context, extend out over one end of the two elongate insulating layers so that they also insulate the ends of the lines located therebetween. This end of the apparatus, that is to say that at which the sensor is located, may be rounded-off without exposing the electric lines. If, at the same time, the materials for the above-mentioned lines, insulating layers and outer layers are selected such that high flexibility is imparted to the apparatus in its entirety, the apparatus will be particularly suited for temperature measurement in, for example, the mouth where such properties are required.

By using plastics-coated paper for both the inner, insulating layers and the outer, insulating layers, the two inner layers may be mutually combined, both between and outside the electric lines disposed in parallel, at the same time as the insulating outer layers may be combined, on the one hand mutually and on the other hand with the two inner, insulating layers.

PREFERRED EMBODIMENT OF THE INVENTION

Figure 1:
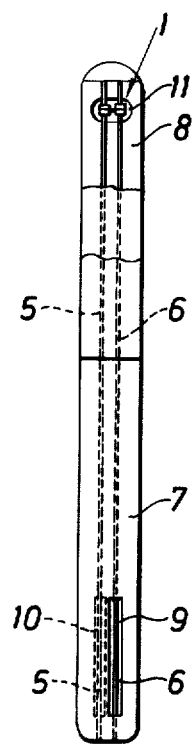
FIG. 1 shows a preferred embodiment of the apparatus according to the invention, certain parts of the different material layers having been removed.
Figure 2:
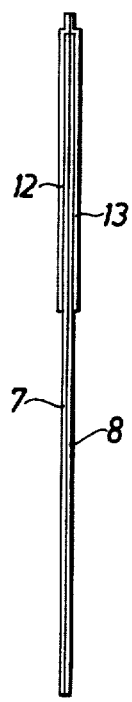
FIG. 2 is a side elevation of the same apparatus.
Figure 3:
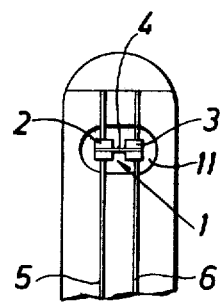
FIG. 3 is an enlargement of the forward end of the apparatus.
Figure 4:
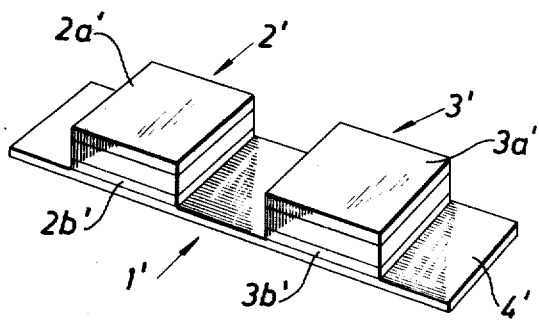
FIG. 4 shows an alternative embodiment of the sensor which is used in the apparatus according to FIGS. 1–3.

The apparatus shown as an example comprises, thus, a temperature-sensitive sensor which is designated in its entirety with 1 in FIGS. 1 and 3, and 1', respectively, in FIG. 4. This sensor consists, according to FIGS. 1–3 of two thermistors 2 and 3 which are interconnected via an intermediate line 4. In FIG. 4, the thermistors are, instead, designated 2' and 3', respectively, whereas the intermediate line consists of a copper foil which is designated 4'. The terminals of the one thermistor are, here, designated 2a' and 2b', whereas the terminals of the second thermistor are designated 3a' and 3b'.

Furthermore, the two thermistors 2 and 3 are connected to electric lines 5 and 6, respectively. In the embodiment according to FIG. 4, the corresponding line is connected to the terminals 2a' and 3a'.

The two electric lines 5 and 6 are encapsulated between two inner, insulating layers 7 and 8 which present mutually offset holes 9, 10, respectively, each in register with their respective lines 6, 5, respectively. As a result, these two lines 6 and 5 are exposed through the holes 9 and 10. More particularly, the opening 9 extends through the insulating layer 7 to expose the conductor 6 for the purpose of permitting electrical contact therewith from one side of the apparatus, while the opening 10 extends through the insulating layer 8 to expose the conductor 5 for the purpose of permitting electrical contact therewith from an opposite side of the apparatus. Because the openings 9, 10 are offset, the conductors 5, 6 can be engaged from opposite sides of the apparatus by a temperature reading unit (not shown) adapted to receive from the conductors 5, 6 electrical signals representing a temperature sensed by the sensor 1 and to convert the signals into a readable temperature value. The temperature reading unit can be similar to the one disclosed in U.S. Pat. No. 4,253,334, whose contents have already been incorporated herein by reference thereto.

The two insulating layers 7 and 8 consist suitably of plastics-coated paper, which facilitate manufacture, since the thermal sealing may be used to unite the two layers with each other and with other materials. At the same time, use of the apparatus according to the invention is made possible in a humid environment.

The two insulating layers 7 and 8 present, furthermore, holes 11 located in register with each other and with the sensor.

The sensor 1 and the holes 11 located in register therewith are covered by two insulating, outer layers 12 and 13. These outer layers are provided only along the forward end of the apparatus and, thus, do not cover the holes 9 and 10.

As is most clearly apparent from FIG. 1, the two electric lines 5 and 6 are substantially of the same length as the two elongate, insulating layers 7 and 8, between which they are located, the sensor 1 being located proximal to one end which, as above and in the following discussion, will be designated as the forward end of the apparatus, whereas the mutually offset holes 9 and 10 are located proximal to the opposite end of the insulating layers.

The two insulating, outer layers 12 and 13 extend out over the forward end of the two inner, insulating layers, such that they also insulate the ends of the lines 5 and 6 located therebetween. As a result, this forward end may be rounded-off without exposing the lines.

PREFERRED MANNER OF MANUFACTURE

Figure 5:
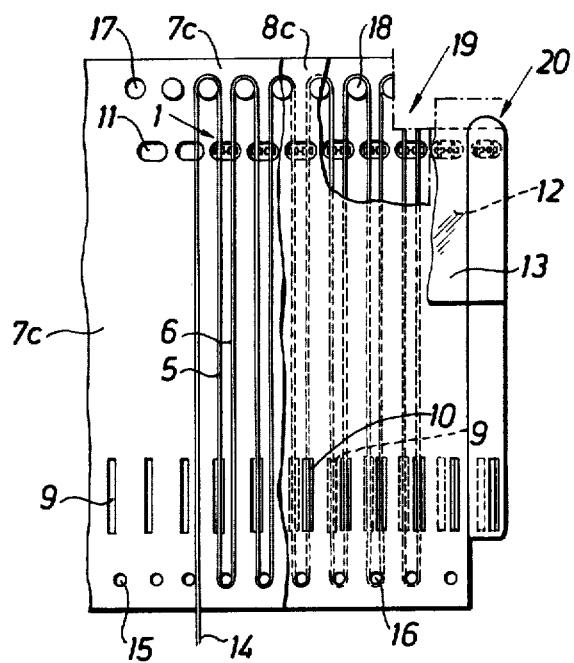
FIG. 5 is intended to illustrate a simple method for realizing the apparatus shown in FIGS. 1–3.
Figure 6:
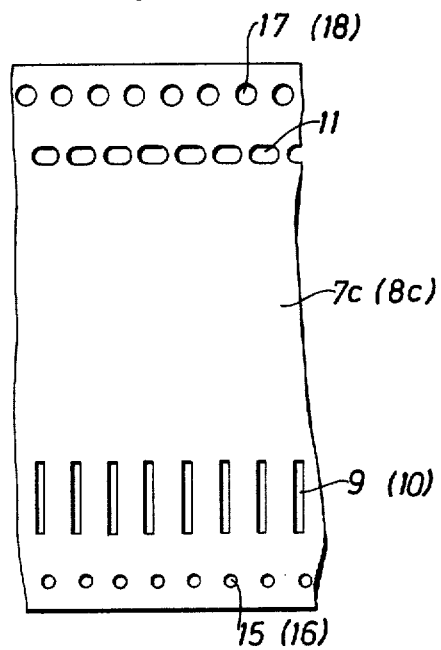
FIG. 6 shows, finally, one of the material layers used in the realization according to FIG. 5.

The apparatus according to the invention is suitably manufactured in the manner which is illustrated in greater detail by FIGS. 5 and 6. A conducting means 14, for example a thin copper wire, is led in zig-zag formation between two paper webs 7c and 8c. The webs 7c, 8c include punched holes 15, 17 and 16, 18, respectively, and are synchronously driven by members entering these holes, such as driving sprockets, pins, etc., mounted on a drum (not shown) or the like. In the preferred embodiment, the pins entering holes 17 and 18 are larger than the pins entering holes 15 and 16 so as to control the spacing between lines 5 and 6. That is, the smaller pins produce a reduced space between lines 5 and 6 for each unit to be formed, whereas the larger pins produce a larger space between the lines 5 and 6 of one unit and an adjacent unit. Also, in the preferred embodiment, the paper webs 7c, 8c are heat sealed together and thereby maintain the lines 5 and 6 in position between the paper webs. In addition, the web 7c includes a hole 9 formed therein, and the web 8c includes a hole 10 formed therein, and as a result of the synchronous driving of the webs, holes 9 and 10 are mutually offset from each other so that hole 9 is in register with line 5, and hole 10 is in register with line 6. Both of the webs are provided with holes 11 which, as a result of the synchronous advancement, will be located in register with each other. In register with these holes 11, the lines 5 and 6 formed by the wire 14 will also be exposed, to which lines the sensor 1 is connected by soldering or the like. Thereafter, the two outer strip portions of the webs 7c and 8c with the holes 15, 16, 17 and 18 may be cut off. This is intimated at the arrow 19. Thereafter, the outer layers 12 and 13 are applied, which also suitably is effected in the form of two webs. For the sake of simplicity however, no such complete webs are shown in FIG. 5. Finally, the forward end of the apparatus is rounded-off by punching, this suitably being effected in conjunction with the punching-out in its entirety of the apparatus from the produced material web.

FIG. 5 illustrates the manner of manufacture, naturally schematically, in a highly concentrated state. In practice, the various manufacturing operations are effected by means of different devices in completely separate processes, for example, in separate stations along a material web of greater length, this being constructed gradually.

Finally, FIG. 6 shows a material web which may constitute one of the material webs 7c and 8c, which differ from each other only through the location of the holes 9 and 10, respectively. The holes 17 and 18, and 15 and 16, respectively are, thus, identical, at the same time as both webs contain holes 11.

Naturally, the invention is not restricted only to the above-described embodiment, but may be varied within the spirit and scope of the appended claims. For example, the plastics-coated paper layers 7 and 8 may be replaced by layers of waxed paper with, for example, a hotmelt coating on one side for the purposes of unification. Alternatively, they may be replaced by normal paper without moisture insulation, since this may be provided by means of the outer layers 12 and 13. The sealing may, in this case, be realized with the assistance of hotmelt, adhesive or other suitable binder.

We claim:

1. Apparatus for measuring temperature, comprising a first electrical insulating layer, having a first surface and a second surface opposite said first surface of said first insulating layer; a second electrical insulating layer, having a first surface and a second surface opposite said first surface of said second insulating layer, said second surface of said second insulating layer being attached to said surface of said first insulating layer; first and second electrical conductors disposed between said first and second insulating layers; sensing means located within at least one of said first and second insulating layers for sensing temperature, said sensing means being electrically connected to said first and second electrical conductors and having electrical properties which vary with temperature; a first opening formed in said first surface of said first insulating layer and extending through said first insulating layer to said second surface thereof so as to expose said first electrical conductor for the purpose of permitting electrical contact therewith from one side of said apparatus; and a second opening formed in said first surface of said second insulating layer and extending through said second insulating layer to said second surface thereof so as to expose said second electrical conductor for the purpose of permitting electrical contact therewith from the other side of said apparatus, said first opening being offset from said second opening such that said first electrical conductor is insulated by said second insulating layer to thereby inhibit electrical contact with said first electrical conductor from said other side of said apparatus and said second electrical conductor is insulated by said first insulating layer to thereby inhibit electrical contact with said second electrical conductor from said one side of said apparatus, whereby said first and second electrical conductors can be contacted electrically from opposite sides of said apparatus by a temperature reading unit adapted to receive from said first and second electrical conductors electrical signals representing a temperature sensed by said sensing means and then convert the signals into a readable temperature value.

2. The apparatus of claim 1, wherein said openings are laterally offset from each other.

3. The apparatus of claim 1, wherein said first and second insulating layers are plastic-coated paper.

4. The apparatus of claim 1, wherein said sensing means includes a pair of thermistors.

5. The apparatus of claim 1, wherein said apparatus is highly flexible.

6. The apparatus of claim 1, further comprising receiving means for receiving said sensing means, said receiving means including a first hole provided in said first insulating layer and a second hole provided in said second insulating layer, said second hole being in register with said first hole.

7. The apparatus of claim 6, further comprising a third insulating layer applied to said first surface of said first insulating layer so as to cover said first hole and said sensing means without covering said first opening in said first insulating layer and a fourth insulating layer applied to said first surface of said second insulating layer so as to cover said second hole and said sensing means without covering said second opening in said first insulating layer.

8. The apparatus of claim 7, wherein said first and second electrical conductors are parallel to each other.

9. The apparatus of claim 8, wherein said first and second insulating layers are mutually united between said first and second electrical conductors and laterally outwardly of said first and second electrical conductors and said third and fourth insulating layers are united to each other and to said first and second insulating layers, respectively.

10. The apparatus of claim 7, wherein said first and second electrical conductors are substantially the same length as said first and second insulating layers.

11. The apparatus of claim 10, wherein said sensing means is located proximal to one end of said apparatus and said first and second openings are located proximal to an opposite end of said apparatus.

12. The apparatus of claim 11, wherein said one end of said apparatus is rounded-off.

13. The apparatus of claim 11, wherein said third and fourth insulating layers protrude outwardly beyond said first and second insulating layers at said one end of said apparatus, the protruding portions of said third and fourth insulating layers being adhered to each other so as to electrically insulate adjacent ends of said first and second electrical conductors.

14. The apparatus of claim 13, wherein said third and fourth insulating layers are made from plastic-coated paper.

15. The apparatus of claim 13, wherein said third and fourth insulating layers are made from a liquid-tight flexible material.

* * * * *